UNITED STATES PATENT OFFICE.

JONAS W. AYLSWORTH, OF EAST ORANGE, NEW JERSEY, ASSIGNOR TO HALOGEN PRODUCTS COMPANY, OF GLEN RIDGE, NEW JERSEY, A CORPORATION OF NEW JERSEY.

POLISHING COMPOSITION.

1,090,440. Specification of Letters Patent. Patented Mar. 17, 1914.

No Drawing. Application filed May 12, 1913. Serial No. 767,153.

*To all whom it may concern:*

Be it known that I, JONAS W. AYLSWORTH, a citizen of the United States, and a resident of East Orange, in the county of Essex, State of New Jersey, have invented certain new and useful Improvements in Polishing Composition, of which the following is a description.

My invention relates to an improved polishing composition for wood floors, shoes, leather, furniture, etc., and my object is to provide an improved composition of this character having certain novel and useful properties.

This composition comprises one or more of the higher halogen substitution products of naphthalene, compounded with a hard, amorphous resin and a volatile solvent which will retain both ingredients in solution or in the form of paste. The solvent is preferably one which is non-inflammable, and also preferably composed of acetylene-tetra-chlorid or equivalent slowly-volatile solvent or the same in mixture with a rapid drying solvent, such, for example, as tri-chloro-ethylene, the mixed solvent being better adapted for certain uses. The hard amorphous resin referred to is preferably a permanently fusible phenolic condensation product, the resin which I consider best adapted to the desired purpose being a condensation product of a cresol and formaldehyde, having a melting point of 100° C. or higher. Suitable dyes or pigments may be added as desired for polishes of different colors. Compositions such as described have the novel property of being non-inflammable, and at the same time form a fine water-proof polish.

The composition may be described as having properties intermediate between those of a varnish and a wax.

The non-inflammable nature of the composition serves in a measure to retard ignition of surfaces to which it is applied. It also eliminates the fire risk incident to storing or applying the polish.

The following is given as an example of suitable proportions for a floor and furniture polish, within my invention:

(1) 750 parts by weight of distilled solid chloro-naphthalene, preferably a mixture of tetra-chloro-naphthalene and penta-chloro-naphthalene. 400 to 550 parts of a fusible phenolic condensation product of a cresol and formaldehyde, having a melting point of 100° C. or higher. Ortho-cresol resin, which is permanently fusible, that is, which is not transformed into an infusible condensation product by heating to from 100° C. to 200° C., is preferred. 550 to 650 parts of acetylene-tetra-chlorid or equivalent slowly volatile solvent. 800 to 1200 parts of a rapid drying solvent, such as di-chloro-ethylene, tri-chloro-ethylene, benzol, or a mixture of the same. Suitable dyes may be added when desired.

The following is given as an example of suitable proportions for a composition intended to form a paste for polishing leather shoes, etc.:

(2) 750 parts by weight solid chloro-naphthalene, as in Example 1. 200 to 400 parts ortho-cresol resin, having a melting point of over 100° C. 200 to 400 parts of acetylene tetra-chlorid. 300 to 600 parts of tri-chloro-ethylene.

In forming the above paste composition the solid ingredients may be dissolved in the solvent by the aid of heat until all of the same have gone into solution, after which the liquid is cooled. Part of the composition will now segregate as granules or crystals. To reduce the mass to a uniform paste it is now ground in a suitable paint mill, wherein it is converted to a uniform greasy paste, of vaseline-like texture. Suitable dyes or pigments may be added before the grinding operation.

The paste just described, (Example 2) may be applied to shoes or the like, and rubbed to a fine gloss as soon as the rapid-drying solvent has dried. The polish thus formed will be hard and not at all sticky, and will be water-proof, and harmless to leather articles.

The fluid polish, Example No. 1, does not require rubbing, but forms a highly polished surface as soon as it dries, without rubbing.

The compositions described herein are also suitable for wood-fillers.

Having now described my invention what I claim and desire to protect by Letters Patent is as follows:—

1. As a new article of manufacture, a polish composition comprising a higher halogen substitution product of naphthalene, a hard amorphorous resin and a volatile solvent for the said product and resin, substantially as described.

2. As a new article of manufacture, a polish composition comprising a higher halogen substitution product of naphthalene, a permanently fusible, soluble phenolic resin and a volatile solvent for the said product and resin, substantially as described.

3. As a new article of manufacture, a polish composition comprising a higher halogen substitution product of naphthalene, a permanently fusible, soluble phenolic resin and a solvent for the said product and resin consisting of a slowly-volatile liquid and a rapid drying liquid, substantially as described.

4. As a new article of manufacture, a polish composition comprising a higher halogen substitution product of naphthalene, a permanently fusible, soluble phenolic resin and a volatile solvent for the said product and resin comprising acetylene-tetra-chlorid, substantially as described.

5. As a new article of manufacture, a polish composition comprising a higher solid chloro-naphthalene, a permanently fusible, soluble, cresol resin having a melting point of at least 100° C. acetylene-tetra-chlorid and a rapid-drying solvent, substantially as described.

6. As a new article of manufacture, a polish composition comprising a higher solid chloro-naphthalene, a permanently fusible, soluble, cresol resin and acetylene-tetra-chlorid, substantially as described.

7. As a new article of manufacture, a polish composition comprising a higher solid chloro-naphthalene, a permanently fusible, soluble, cresol resin having a melting point of at least 100° C., acetylene-tetra-chlorid and tri-chloro-ethylene, substantially as described.

8. As a new article of manufacture, a non-inflammable composition adapted to form a water-proof polish for wood and leather, comprising a higher halogen substitution product of naphthalene compounded with a hard amorphous permanently fusible phenolic resin and a volatile non-inflammable solvent in which said substitution product and resin are retained in solution or suspension, substantially as described.

This specification signed and witnessed this 9th day of May 1913.

JONAS W. AYLSWORTH.

Witnesses:
DELOS HOLDEN,
MARY J. LAIDLAW.